(12) United States Patent
Vester

(10) Patent No.: US 6,203,818 B1
(45) Date of Patent: Mar. 20, 2001

(54) NUTRITIONAL SUPPLEMENT FOR CARDIOVASCULAR HEALTH

(75) Inventor: Samuel Russell Vester, Cincinnati, OH (US)

(73) Assignee: Coventry Group, Ltd., Cincinnati, OH (US)

( * ) Notice: Subject to any disclaimer, the term of this patent is extended or adjusted under 35 U.S.C. 154(b) by 0 days.

(21) Appl. No.: 09/045,464

(22) Filed: Mar. 20, 1998

Related U.S. Application Data

(60) Provisional application No. 60/041,326, filed on Mar. 20, 1997.

(51) Int. Cl.$^7$ .................. A61K 35/34; C07D 475/00; C07D 311/04

(52) U.S. Cl. .................. 424/569; 544/261; 549/403

(58) Field of Search .................. 424/569; 544/261; 549/403

(56) References Cited

U.S. PATENT DOCUMENTS

| | | | |
|---|---|---|---|
| 3,689,663 | 9/1972 | Krämer et al. | 424/195.1 |
| 3,903,266 | 9/1975 | Robbins | 424/195.1 |
| 4,842,859 | 6/1989 | Liu | 424/195.1 |
| 4,940,658 | 7/1990 | Allen et al. | 435/4 |
| 5,043,323 | 8/1991 | Bombardelli et al. | 514/52 |
| 5,108,750 | 4/1992 | Liu | 424/195.1 |
| 5,215,750 | 6/1993 | Keane, II | 424/440 |
| 5,364,644 | 11/1994 | Walaszek et al. | 514/574 |
| 5,514,382 | 5/1996 | Sultenfuss | 424/440 |
| 5,563,126 | 10/1996 | Allen et al. | 514/52 |

FOREIGN PATENT DOCUMENTS

| | | |
|---|---|---|
| WO91/11117 | 8/1991 | (WO) . |
| WO96/13179 | 5/1996 | (WO) . |

OTHER PUBLICATIONS

White et al; "Principles of Biochemistry", 6th edition; p. 419, 1978.*
L.J. Machlin: "Handbook of Vitamins; second edition" 1990, Marcel Dekker, New York SP002082605, pp. 477, 478,482,572–575.
International Search Report dated Nov. 12, 1998.
Sue Rodwell Williams, Nutrition and deit therapy, *The C. V. Mosby Company*, 1969, pp. 111–116.
R. Gugler et al., Disposition of Quercetin in Man after Single Oral and Intravenous Doses*, *Europ. J. clin. Pharamacol.* 9, 229–234 (1975).
Joachim Kühnau, The Flavonoids. A Clas of Semi–Essential Food Components: Their Role in Human Nutrition, *Wld Rev. Nutr. Diet.*, vol. 24, pp. 117–191 (Karger, Basel 1976).
Umeo Takahama, Inhibition of Lipoxygenase–Dependent Lipid Peroxidation by Queretin: Mechanism of Antioxidative Function, *Phytochemistry*, vol. 24, No. 7, pp. 1443–1446, 1985.
W.S. Pierpoint, Flavonoids in the Human Diet, *Plant Flavonoids in Biology and Medicine: Biochemical, Pharmacological, and Structure–Activity Relationships*, pp. 125–140, Alan R. Liss, Inc. 1986.
Jadwiga Robak et al., Flavonoids are Scavengers of Superoxide Anions, *Biochemical Pharmacology*, vol. 37, No. 5, pp. 837–841, 1988.
Roger R. Williams et al., Hyperhomocyst(e)inemia in Utah siblings with early coronary disease, *Coronary Artery Disease*, 1990, 1:681–685.
Jacques J. Genest, Jr. et al., Plasma Homocyst(e)ine Levels in Men With Premture Coronary Artery Disease, *JACC*, vol. 16, No. 5, Nov. 1, 1990, pp. 1114–1119.
Lars Brattström et al., Impaired homocysteine metabolism in erly–onset cerebral and peripheral occlusive arterial disease, *Atherosclerosis*, 81 (1990) 51–60.
Catherine V. deWhalley et al., Flavonoids Inhibit the Oxidative Modification of Low Density Lipoproteins by Macrophages, *Biochemical Pharmacology*, vol. 39, No. 11, pp. 1743–1750, 1990.
Nobuyuki Ito, Is Quercetin Carcinogenic?, *Jpn. J. Cancer Res.*, 83, 312–314, Mar. 1992.
Dunnick JK et al., Toxicity and carcinogenicity studies of quercetin, a natural component of foods, *Fundamental & Applied Toxicology* 19(3) :423–31, Oct. 1992.
Gaspar J. Laires A. et al., Quercetin and the mutagenicity of wines, *Mutagenesis* 8 (1) :51–5, Jan. 1993.
E.N. Frankel, Inhibition of oxidation of human low–density lipoprotein by phenolic substances in red wine, *The Lancet*, vol. 341: Feb. 20, 1993, pp. 454–457.
Michaël G.L. Hertog et al., Dietary antioxidant flavonoids and risk of coronary heart disease: the Zutphen Elderly Study, *The Lancet*, vol. 342, Oct. 23, 1993, pp. 1007–1011.
Laires A. Gaspar et al., Genotoxicity of nitrosated red wine and of the nitrosatable phenolic compounds present in wine: tyramine, quercetin and malvidine–3–glucoside, *Food & Chemical Toxicology*, 31(12) :989–94, Dec. 1993.
Michaël G.L. Hertog, Content of Potentially Anticarcinogenic Flavonoids of Tea Infusions, Wines, and Fruit Juices, *J. Agric. Food Chem.*, 1993, 41, 1242–1246.
L. Daly et al., Hyperhomocysteinaemia: a metabolic risk factor for coronary heart disease determined by both genetic and environmental influences?, *Quarterly Journal of Medicine*, 1993; 86:685–689.

(List continued on next page.)

*Primary Examiner*—Louise N. Leary
(74) *Attorney, Agent, or Firm*—Thompson Hine & Flory LLP

(57) ABSTRACT

A nutritional supplement for improving cardiovascular health via aiding in preventing, delaying the onset of and/or slowing the progression of atherosclerosis and coronary heart disease, the supplement comprising one or more flavonoids and folic acid or folate; and a method for aiding in preventing, delaying the onset of and/or slowing the progression of atherosclerosis and coronary heart disease are described.

20 Claims, No Drawings

OTHER PUBLICATIONS

Brief Critical Reviews, Dietary Flavonoids and Risk of Coronary Heart Disease, *Nutrition Reviews*, vol. 52, No. 2, Feb. 1994: 59–68.

Petra Verhoef et al., A Prospective Study of Plasma Homocyst(e)ine and Risk of Ischemic Stroke, *Stroke*, vol. 25, No. 10, Oct. 1994, pp. 1924–1930.

Brief Critical Reviews, Vitamin Nutrition Stqatus and Homocysteine: An Atherogenic Risk Factor, *Nutrition Reviews*, vol. 52, No. 11, Nov. 1994: 383–393.

Palgan, K. et al., [Flavonoids in medicine]. [Review] [Polish], *Postepy Higieny i Medycyny Doswiadczalnej.* 48(5):589–601, 1994.

A. Das et al., Carcinogenicity, mutagenicity and cancer preventing activities of flavonoids: A structure–system–activity relationship (SSAR) analysis, *Progress in Drug Research*, vol. 42, Edited by Ernst Jucker, 1994, pp. 133–166.

Chithan Kandaswami et al., Free Radical Scavenging and Antioxidant Activity of Plant Flavonoids, *Free Radicals in Diagnostic Medicine*, Edited by D. Armstrong, Plenum Press, New York, 1994, pp. 351–376.

Andrew G. Bostom et al., High dose ascorbate supplementation fails to affect plasma homocyst(e)ine levels in patients with coronary heart disease, *Atherosclerosis 111* (1994) 267–270.

Nonglak Pancharuniti et al., Plasma homocyst(e)ine, folate, and vitamin B–12 concentrations and risk for early–onset coronary artery disease, *Am J Clin Nutr*, 1994;59:940–8.

Lily L. Wu et al., Plasma Homocyst(e)ine as a Risk Factor for Early Familial Coronary Artery Disease, *General Clinical Chemistry*, 552–561 (1994).

Meir J. Stampfer et al., Can Lowering Homocysteine Levels Ruduce Cardiovascular Risk?, *The New England Journal of Medicine*, Feb. 2, 1995, pp. 328–329.

Michaël G.L. Hertog et al., Flavonoid Intake and Long–term Risk of Coronary Heart Disease and Cancer in the Seven Countries Study, *Arch Intern Med*, vol. 155, pp. 381–386, Feb. 27, 1995.

Jiri J. Frohlich, Lipoproteins and homocyst(e)ine as risk factors for atherosclerosis: Assessment and treatment, *Can J Cardiol*, vol. II, Suppl C, May 1995, pp. 18C–23C.

S.M. Wedworth et al., Dietary flavonoids in atherosclerosis prevention [Review], *Annals of Pharmacotherapy*, 29(6): 627–8, Jun. 1995.

Shawn M. Wedworth et al., Dietary Flavonoids in Atherosclorosis Prevention, *The Annals of Pharmacotherapy*, Jun. 1995, vol. 29, pp. 627–628.

Wayne H. Giles et al., Serum Folate and Risk for Ischemic Stroke, First National Health and Nutrition Examination Survey Epidemiologic Follow–up Study, *Stroke*, vol. 26, No. 7, pp. 1166–1170, Jul. 1995.

Carol J. Boushey et al., A Quantitative Assessment of Plasma Homocysteine as a Risk Factor for Vascular Disease, *JAMA*, Oct. 4, 1995, vol. 274, No. 13, pp. 1049–1057.

Ottar Nygard et al., Total Plasma Homocysteine and Cardiovascular Risk Profile, The Hordaland Homocysteine Study, *JAMA*, Nov. 15, 1995, vol. 274, No. 19, pp. 1526–1533.

Killian Robinson et al., Hyperhomocysteinemia and Low Pyridoxal Phosphate, *Circulation*, vol. 92, No. 10, Nov. 15, 1995, pp. 2825–2830.

I.J. Perry, Prospective study of serum total homocysteine concentration and risk of stroke in middle–aged British men, *The Lancet*, vol. 346, Nov. 25, 1995, pp. 1395–1398.

Brief Critical Reviews, Homocysteine—An Atherogenic and a Thrombogenic Factor?, *Nutrition Reviews*, vol. 53, No. 11, pp. 323–332, Nov. 1995.

Franco Laghi Pasini et al., Plasma Homocysteine in Ischemic Stroke, *Stroke*, vol. 26, No. 12, Dec. 1995, pp. 2374–2375.

Cecil R. Pace–Asciak et al., The red wind phenolics trans–resveratrol and quercetin block human platelet aggregation and eicosanoid synthesis: Implications for protection against coronary heart disease, *Clinica Chimica Acta 235* (1995) 207–219.

Peter C.H. Hollman et al., Absorption of dietary quercetin glycosides and quercetin in healthy ilesotomy volunteers, *Am J Clin Nutr*, 1995; 62: 1276–82.

Johan B. Ubbink et al., Results of B–Vitamin Supplementation Study Used in a Prediction Model to Define a Reference Range for Plasma Homocysteine, *Clinical Chemistry*, vol. 41, No. 7, pp. 1033–1037, 1995.

Johan B. Ubbink et al., Effective homocysteine metabolism may protect South African blacks against coronary heart disease, *Am J Clin Nutr*, 1995 62:802–8.

M. Schüssler et al., Myocardial Effects of Flavonoids from Crataegus Species, *Arzneim–Forsch./Drug Res.* 45 (II), Nr. 8 (1995), pp. 842–845.

Caria H. Chaveca T., Genotoxicity of queretin in the micronucleus assay in mouse bone marrow erythrocytes, human lymphocytes, V79 cell line and identification of kinetochore–containing (CREST staining) micronuclei in human lumphocytes, *Mutation Research*, 343(2–3):85–94, Jun. 1995.

Egil Arnesen et al., Serum Total Homocysteine and Coronary Heart Disease, *International Journal of Epidemiology*, vol. 24, No. 4, 1995, pp. 704–709.

A.F.E. Rump et al., Effects of Different Inotropes with Antioxidant Properties on Acute Regional Myocardial Ischemia in Isolated Rabbit Hearts, *Gen. Pharmac.*, vol. 26, No. 3, pp. 603–611, 1995.

F. Landgren et al., Plasma homocysteine in acute myocardial infarction: homocysteine–lowering effect of folic acid, *Journal of Internal Medicine*, 1995: 237: 381–388.

Paul Knekt et al., Flavonoid intake and coronary mortality in Finland: a cohort study, *BMJ*, vol. 312, Feb. 24, 1996, pp. 478–481.

Ellen L. Mayer et al., Homocysteine and Coronary Atherosclerosis, *JACC*, vol. 27, No. 3, Mar. 1, 1996:517–27.

Sirving O. Keli et al., Dietary Flavonoids, Antioxidant Vitamins, and Incidence of Stroke, The Zutphen Study, *Arch Intern Med.*, vol. 156, Mar. 25, 1996, pp. 637–642.

Howard I. Morrison et al., Serum Folate and Risk of Fatal Coronary Heart Disease, *JAMA*, Jun. 26, 1996, vol. 275, No. 24, pp. 1893–1896.

Norman R.C. Campbell, M.D., How Safe Are Folic Acid Supplements?, *Arch Intern Med.*, vol. 156, Aug. 12/26, 1996, pp. 1638–1644.-

Paula M. Gallagher et al., Homocysteine and Risk of Premature Coronary Heart Disease (Evidence for a Common Gene Mutation), *Circulation*, vol. 94, No. 9, Nov. 1, 1996, pp. 2154–2158.

Barry C. Herzlich et al., Ralationship among Homocyst(e)ine, Vitamin B-12 and Cardiac Disease in the Elderly: Association between Vitamin B-12 Deficiency and Decreased Left Ventricular Ejection Fraction, *American Institute of Nutrition*, 1996, pp. 1249S–1253S.

Johan B. Ubbink et al., Plasma Homocysteine Concentrations in a Pouplation with a Low Coronary Heart Disease Prevalence, *American Institute of Nutrition*, 1996, pp. 1254S–1257S.

Arno G. Motulsky, Invited Editorial, Nutritional Ecogenetics: Homocysteine–Related Arteriosclerotic Vascular Disease, Neural Tube Defects, and Folic Acid, *Am. J. Hum. Genet.*, 58:17–20, 1996.

* cited by examiner-

NUTRITIONAL SUPPLEMENT FOR CARDIOVASCULAR HEALTH

This application claims priority from Provisional Application No. 60/041,326 filed Mar. 20, 1997.

BACKGROUND OF THE INVENTION

This invention relates to a nutritional supplement composition, more particularly, to a nutritional supplement composition that is intended to benefit cardiovascular health via aiding in preventing, delaying the onset of and/or slowing the progression of atherosclerosis and coronary heart disease (CHD), and to a method for aiding in preventing, delaying the onset of and/or slowing the progression of atherosclerosis and CHD by administration of the nutritional supplement composition to an individual.

According to the 1996 American Heart Association statistical summary, 42% of all deaths in America are from some form of cardiovascular disease. Since cardiovascular disease is the leading cause of death in the United States and many other developed countries, it is not surprising that heart specialists and physicians in general arc frequently asked to provide advice concerning nutritional factors that may aid in preventing, delaying the onset of and/or slowing the progression of atherosclerosis and CHD.

The use of vitamin and mineral supplements in one's diet is well established. Specifically, vitamin and mineral supplements heretofore devised and used for the purpose of providing daily nutrients are known to consist basically of familiar, predictable and obvious combinations. While many of the known supplements are adequate to fulfil their objectives, few have been specifically composed for improving cardiovascular health via aiding in preventing, delaying the onset of and/or slowing the progression of atherosclerosis and coronary heart disease.

A number of synthetic drug formulations are available to maintain and benefit cardiovascular health or to treat or prevent atherosclerosis and coronary heart disease. Clofibrate, Gemfibrozil, Questran, Colestipol and HMG CoA reductase inhibitors arc a few examples of synthetic drugs prescribed for decreasing cholesterol and triglyceride levels. All of the above-mentioned drugs have significant potential for side effects which include nausea, hepatic dysfunction, bone marrow suppression, gastrointestinal discomfort, heartburn, diarrhea, constipation, etc.

Aspirin is known to decrease platelet aggregation, reduce the incidence of transient ischemic attacks, ameliorate a myocardial infarction, and has been used as a prophylactic agent for these purposes. Aspirin, however, is known to have a variety of undesirable side effects. For example, aspirin can contribute to formation of gastric ulcers. At higher doses, patients may experience tinnitus, decreased hearing and vertigo. In addition, patients with hemophilia are particularly susceptible to serious side effects of aspirin.

Given the above problems, there remains a need for a nutritional supplement that contains naturally occurring ingredients which can by design provide specific nutritional elements that available studies have shown provide potential benefit in preventing, delaying the onset of and/or slowing the progression of atherosclerosis and coronary heart disease. The nutritional supplement of the invention is also expected to provide these benefits without anticipation of untoward side effects.

SUMMARY OF THE INVENTION

The present invention provides a nutritional supplement composition comprising one or more flavonoids and folic acid or folate (i.e., salts or esters of folic acid). More particularly it provides a nutritional supplement formulation containing a prophylactically effective amount of one or more flavonoids and folic acid or folate which is specifically dedicated to aiding in preventing, delaying the onset of and/or slowing the progression of atherosclerosis and CHD. A particularly preferred nutritional supplement composition comprises quercetin and folic acid or folate.

The present invention also provides a method for aiding in preventing, delaying the onset of and/or slowing the progression of atherosclerosis and CHD which comprises the step of administering the nutritional supplement composition to an individual who is at risk or may be at risk of atherosclerosis and coronary heart disease.

DETAILED DESCRIPTION OF THE INVENTION

The present invention provides a composition which is useful as a nutritional supplement to aid in preventing, delaying the onset of and/or slowing the progression of atherosclerosis and coronary heart disease. The composition of the present invention is a combination of one or more flavonoids and folic acid or folate. The combined use of these two supplements is believed to respond to some, if not most, of the common conditions implicated in cardiovascular disease such as platelet aggregation, oxidation of blood lipids in arterial walls, and elevated homocysteine levels. These agents may be combined in an oral dosage with other well known nutritional supplements and/or non-flavonoid antioxidants, e.g., selenium, vitamin E (tocopherol, particularly α-tocopherol, etc.), vitamin C (ascorbic acid) and coenzyme Q10. Dietary fiber supplements may also be used in the composition.

Flavonoids, also known as "phenylchromones," are naturally occurring, water-soluble compounds which have antioxidant characteristics. Flavonoids are widely distributed in vascular plants and are found in numerous vegetables, fruits and beverages such as tca and wine (particularly red wine) and, therefore, are a common component of the human diet. The animal kingdom is unable to synthesize the flavone nucleus; flavonoids are therefore strictly exogenous food components of plant origin.

Flavonoids are conjugated aromatic compounds having the general

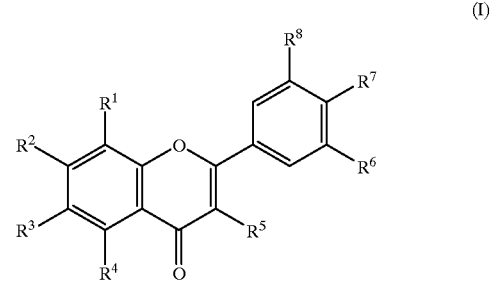

(I)

where $R^1$, $R^2$, $R^3$, $R^4$, $R^5$, $R^6$, $R^7$ and $R^8$ are independently selected from H and OR' where R' is H or an alkyl group having about 1 to 10 carbon atoms. As of the mid 1980's more than 4000 chemically unique flavonoids have been identified and this is only a fraction of the total number likely to be present in nature. The most widely occurring flavonoids are flavones and flavonols. While the present invention is open to the use of all flavonoids, flavonols and more particularly, myricetin, (3,5,7,3',4',5',- hexahydroxyflavone), quercetin (3,5,7,3',4'-pentahydroxyflavone), kaempferol (3,5,7,4'-tetrahydroxyflavone), and flavones apigenin (5,7,4'-trihydroxyflavone) and luteolin (5,7,3',4'-tetrahydroxyflavone) and glycosides thereof are preferred. The most preferred flavonoid for use in the invention is quercetin.

It is believed that quercetin, which exhibits some of the strongest antioxidant effects of the flavonoids and which has been reported to inhibit oxidation and cytoxicity of low density lipoproteins (LDL), may have beneficial health consequences since oxidized low density lipoproteins are reported to be atherogenic, i.e., they contribute to the buildup of fatty substances in the arterial wall. Lipid peroxidation is caused by free radicals. Free radicals are molecules with at least one unpaired electron, which makes them highly reactive. Free radicals are continually formed in the metabolic processes of the human body but are tightly regulated. Human plasma contains various antioxidants which makes it difficult for such reactions to occur within the plasma. When LDL is within the arterial wall, the situation is different and the plasma antioxidant protection is not available. The reaction that can result in buildup of oxidized lipids in the arterial wall can be stopped or decreased by the presence of an antioxidant such as a flavonoid. Flavonoids appear to act by protecting LDL against oxidation, as they inhibit the generation of lipid peroxides and also may help protect alpha-tocopherol (vitamin E), a major lipophilic antioxidant carried in lipoproteins, from being consumed by oxidation in LDL.

Epidemiologic studies supporting red wine and black tea as significant sources of flavonoids have led to the inference that consumption of red wine and black tea in some cultures is correlated to reduced risk of CHD. Quercetin is the flavonoid occurring in highest concentration in both red wine and black tea.

The flavonoid component of the nutritional supplement of the invention may be administered in a daily dose of about 0.1 to 500 mg. and, more likely, about 10 to 50 mg. The most effective amount of flavonoid an individual can consume is not as yet clearly determined.

Folic acid is a B complex vitamin. It is water-soluble and occurs naturally in green plants, fresh fruit, and yeast. Folic acid along with vitamins $B_{12}$ (cyanocobalamin) and $B_6$, plays a key part in homocysteine metabolism. Medical studies have demonstrated that there is a statistically significant positive correlation between total plasma homocysteine levels and the incidence of atherosclerosis and coronary heart disease. Men whose homocysteine levels arc known to be significantly elevated are more likely to suffer myocardial infarction. Also, it has been demonstrated that inadequate folic acid or folate intake is the main determinate of the homocysteine-related increase in carotid artery thickening, another significant manifestation of atherosclerotic disease. The mechanism by which elevated blood homocysteine causes accelerated atherosclerosis has not been clearly established. U.S. population dietary surveys have demonstrated that up to 40 percent of the population may not consume enough folic acid to prevent elevated blood homocysteine levels. Folic acid or folate supplements in the range of 0.4 to 2 mg. per day are usually sufficient to reduce or normalize high homocysteine levels. The folic acid or folate of the nutritional supplement may be administered in a daily dose of about 0.1 to 10 mg. and, more typically, about 0.4 to 1 mg.

In addition to the flavonoids and folic acid or folate, the supplement of the invention may also contain Vitamin $B_{12}$ and Vitamin $B_6$. Vitamins $B_{12}$ and $B_6$ belong to the vitamin B complex group. These closely related vitamins are found in rice, bran, yeast, wheat germ, etc. Each member of the vitamin B complex group is a distinctly different substance with different functions. No one B vitamin can fully replace any other. Vitamin $B_{12}$ is a preferred component of the nutritional supplement of the invention as it provides a safeguard for patients with a vitamin $B_{12}$ deficiency or pernicious anemia. Vitamin B6 can also be present.

Other well known nutritional supplements such as non-flavonoid antioxidants, e.g., selenium, vitamin E (α-tocopherol, etc.), vitamin C (ascorbic acid), coenzyme Q10, niacin and beta-carotene may be effectively used in the nutritional supplement of this invention.

Other additives may be incorporated in the nutritional supplement of the present invention. Such additives include minerals, e.g., boron, etc. and trace metals such as zinc, magnesium, manganese, chromium, molybdenum, copper, iron, calcium, and potassium; and other micronutrients such as thiamine, riboflavin, niacin, pantothenic acid, pyridoxine, choline, biotin, inositol, para-aminobenzoic acid, vitamin D, vitamin K, vitamin A, etc. In another embodiment of the invention a dietary fiber supplement such as oat bran or other natural fiber source may also be added to the composition.

Typically the nutritional supplement will further include a pharmaceutically acceptable carrier such as lactose, glucose, sucrose, corn starch, potato starch, cellulose acetate, ethyl cellulose, etc. Diluents and other additives such as one or more phannaceutically acceptable binding agents, fillers, supports, thickening agents, taste-improving agents, coloring agents, preservatives, stabilizers, regulators, emulsifiers or mixtures thereof may be used depending on the form of the composition employed.

In addition to providing the aforementioned compositions, the invention also includes a method for orally administering the composition in dosages effective to aid in preventing, delaying the onset of and/or slowing the progression of atherosclerosis and coronary heart disease and, more particularly, to a method for orally administering the aforesaid composition to an individual who is at risk of or may be at risk of atherosclerosis and coronary heart disease. The supplement is preferably administered orally but may be administered parenterally. Suitable forms for the nutritional supplement composition for oral or parenteral administration include tablets, capsules, lozenges, syrips, granules, solutions and suspensions which contain unit doses of the supplement for administration once or several times a day. The nutritional supplement composition of the invention will typically be administered orally as a tablet or a capsule. Tablets, gel tabs, capsules, liquid and sustained release formulations can be formulated and prepared according to manufacturing techniques well known in the pharmaceutical industry and in a variety of dosage forms.

Having described the invention in detail, it will be apparent that numerous modifications and variations are possible.

What is claimed is:

1. A nutritional supplement useful in aiding in preventing, delaying the onset of and/or slowing the progression of atherosclerosis comprising quercetin and folic acid or folate wherein said quercetin is present in the supplement in an amount which provides a daily dosage of about 0.1 to 500 mg and folic acid or folate is present in the supplement in an amount to provide a daily dosage of about 0.1 to 10 mg.

2. The supplement of claim 1 wherein said supplement additionally contains a flavonoid selected from the group consisting of myricetin, kaempferol, luteolin and apigenin.

3. The supplement of claim 1 wherein said quercetin is present in an amount to provide a daily dosage of about 10 to 50 mg and said folic acid or folate is present in an amount to provide a daily dosage of about 0.4 to 1.0 mg.

4. The supplement of claim 1 wherein the supplement additionally contains another nutrient selected from the group consisting of vitamin $B_{12}$, vitamin $B_6$, non-flavonoid antioxidants, minerals and trace metals.

5. The supplement of claim 1 wherein said supplement additionally contains a antioxidant selected from the group consisting of selenium, vitamin E, vitamin C, niacin, beta-carotene, coenzyme Q10, or combinations thereof.

6. The supplement of claim 1 wherein said supplement additionally contains zinc, copper, magnesium, manganese, chromium, molybdenum, iron, calcium, or combinations thereof.

7. The supplement of claim 1 wherein said supplement further includes one or more pharmaceutically acceptable binding agents, fillers, supports, thickening agents, taste-improving agents, coloring agents, preservatives, stabilizers, regulators, emulsifiers, or mixtures thereof.

8. A method for aiding in preventing, delaying the onset of and/or slowing the progression of atherosclerosis and coronary heart disease in a person comprising the step of administering to said person a nutritional supplement including quercetin and folic acid or folate wherein said supplement is administered in an amount which provides a daily dosage of quercetin of about 0.1 to 500 mg and a daily dosage of folic acid or folate of about 0.1 to 10 mg.

9. The method of claim 8 wherein said quercetin is present in an amount to provide a daily dosage of about 10 to 50 mg and said folic acid or folate is present in an amount to provide a daily dosage of about 0.4 to 1.0 mg.

10. The method of claim 8 wherein said supplement additionally contains other nutrients selected from the group consisting of vitamin $B_{12}$, vitamin $B_6$, non-flavonoid antioxidants, minerals and trace metals.

11. The method of claim 8 wherein said supplement additionally contains anon-flavonoid antioxidants selected from the group consisting of selenium, vitamin E, vitamin C, niacin, beta-carotene, coenzyme Q10, or combinations thereof.

12. The method of claim 11 wherein said supplement additionally contains a non-flavonoid minerals and trace metals selected from the group consisting of zinc, copper, magnesium, manganese, chromium, molybdenum, iron, calcium, or combinations thereof.

13. The method of claim 8 wherein said supplement further includes one or more pharmaceutically acceptable binding agents, fillers, supports, thickening agents, taste-improving agents, coloring agents, preservatives, stabilizers, regulators, emulsifiers, or mixtures thereof.

14. The method of claim 8 wherein said nutritional supplement is administered orally as a tablet, capsule, liquid, or powder one or several times a day, or said nutritional supplement is administered parenterally.

15. A nutritional supplement comprising quercetin, folic acid or folate, and a dietary fiber supplement wherein said quercetin is present in an amount which provides a daily dosage of about 0.1 to 500 mg and said folic acid or folate is present in an amount which provides a daily dosage of about 0.1 to 10 mg.

16. A method for aiding in preventing, delaying the onset of and/or slowing the progression of atherosclerosis and coronary heart disease in a person comprising the step of administering to said person a nutritional supplement including quercetin, folic acid or folate, and a dietary fiber supplement wherein said quercetin is present in an amount which provides a daily dosage of about 0.1 to 500 mg and said folic acid or folate is present in an amount which provides a daily dosage of about 0.1to 10 mg.

17. The supplement of claim 1 wherein the supplement additionally contains Vitamin C or Vitamin E.

18. The supplement of claim 17 wherein the supplement additionally contains coenzyme Q10.

19. The method of claim 8 wherein said supplement additionally contains Vitamin C or Vitamin E.

20. The method of claim 19 wherein said supplement additionally contains coenzyme Q10.

* * * * *